US011728485B2

(12) United States Patent
Omichi et al.

(10) Patent No.: US 11,728,485 B2
(45) Date of Patent: Aug. 15, 2023

(54) ANODE FOR FLUORIDE ION BATTERY

(71) Applicant: Honda Motor Co., Ltd., Tokyo (JP)

(72) Inventors: Kaoru Omichi, Tochigi (JP); Qingmin Xu, Dublin, OH (US); Christopher Brooks, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 361 days.

(21) Appl. No.: 16/917,735

(22) Filed: Jun. 30, 2020

(65) Prior Publication Data

US 2020/0335788 A1   Oct. 22, 2020

Related U.S. Application Data

(62) Division of application No. 15/724,292, filed on Oct. 4, 2017, now Pat. No. 10,727,487.

(51) Int. Cl.
*H01M 4/587* (2010.01)
*H01M 4/08* (2006.01)
(Continued)

(52) U.S. Cl.
CPC ......... *H01M 4/587* (2013.01); *H01M 4/0404* (2013.01); *H01M 4/0471* (2013.01);
(Continued)

(58) Field of Classification Search
None
See application file for complete search history.

(56) References Cited

U.S. PATENT DOCUMENTS

| 4,416,915 A | 11/1983 | Palmer et al. |
| 5,278,004 A | 1/1994 | Plichta et al. |

(Continued)

FOREIGN PATENT DOCUMENTS

| JP | 2009529222 | 8/2009 |
| JP | 2014501434 | 1/2014 |

(Continued)

OTHER PUBLICATIONS

Thakur et al., "Enhanced electrochemical performance of polypyrrole coated MoS2 nanocomposites as electrode material for supercapacitor application", Journal of Electroanalytical Chemistry 782 (2016) 278-287 (Abstract only).

(Continued)

*Primary Examiner* — Laura Weiner
(74) *Attorney, Agent, or Firm* — Mark E. Duell; Rankin Hill & Clark LLP

(57) ABSTRACT

An anode for a fluoride ion electrochemical cell is provided and includes a layered material of hard carbon, nitrogen doped graphite, boron doped graphite, $TiS_2$, $MoS_2$, $TiSe_2$, $MoSe_2$, $VS_2$, $VSe_2$, electrides of alkali earth metal nitrides, electrides of metal carbides, or combinations thereof. The anode may be included in a fluoride ion electrochemical cell, which additionally includes a cathode and a fluoride ion electrolyte arranged between the cathode and the anode. At least one of the cathode and the anode reversibly exchange the fluoride ions with the electrolyte during charging or discharging of the electrochemical cell.

17 Claims, 7 Drawing Sheets

(51) Int. Cl.
    *H01M 4/04*     (2006.01)
    *H01M 4/62*     (2006.01)
    *H01M 4/36*     (2006.01)
    *H01M 6/14*     (2006.01)
    *H01M 4/58*     (2010.01)
    *H01M 10/05*     (2010.01)
    *H01M 10/36*     (2010.01)
    *H01M 6/04*     (2006.01)
    *H01M 4/1393*     (2010.01)
    *H01M 4/1397*     (2010.01)
    *H01M 4/136*     (2010.01)
    *H01M 4/133*     (2010.01)
    *H01M 10/054*     (2010.01)
    *H01M 4/66*     (2006.01)
    *H01M 4/74*     (2006.01)

(52) U.S. Cl.
    CPC ............ *H01M 4/08* (2013.01); *H01M 4/133* (2013.01); *H01M 4/136* (2013.01); *H01M 4/1393* (2013.01); *H01M 4/1397* (2013.01); *H01M 4/366* (2013.01); *H01M 4/582* (2013.01); *H01M 4/5815* (2013.01); *H01M 4/622* (2013.01); *H01M 4/623* (2013.01); *H01M 4/625* (2013.01); *H01M 4/66* (2013.01); *H01M 4/661* (2013.01); *H01M 6/04* (2013.01); *H01M 6/14* (2013.01); *H01M 10/05* (2013.01); *H01M 10/054* (2013.01); *H01M 10/36* (2013.01); *H01M 4/0416* (2013.01); *H01M 4/74* (2013.01)

(56) References Cited

U.S. PATENT DOCUMENTS

| | | |
|---|---|---|
| 6,270,923 B1 | 8/2001 | Bito et al. |
| 2004/0131939 A1 | 7/2004 | Adamson et al. |
| 2010/0021800 A1 | 1/2010 | Yazami et al. |
| 2010/0221603 A1 | 9/2010 | Yazami et al. |
| 2011/0262816 A1 | 10/2011 | Amatucci |
| 2012/0115035 A1 | 5/2012 | Ota et al. |
| 2012/0164541 A1 | 6/2012 | Darolles et al. |
| 2013/0122361 A1 | 5/2013 | Yazami |
| 2014/0030559 A1 | 1/2014 | Yazami et al. |
| 2014/0087214 A1 | 3/2014 | Amatucci et al. |
| 2015/0166340 A1 | 6/2015 | Son et al. |
| 2015/0303514 A1 | 10/2015 | Nakamoto et al. |
| 2016/0064774 A1 | 3/2016 | Lee et al. |
| 2017/0057908 A1 | 3/2017 | Jones et al. |
| 2017/0200565 A1 | 7/2017 | Zhamu et al. |
| 2017/0207489 A1 | 7/2017 | Zhamu et al. |
| 2018/0309125 A1 | 10/2018 | Beidaghi et al. |

FOREIGN PATENT DOCUMENTS

| | | |
|---|---|---|
| JP | 201672226 | 5/2016 |
| KR | 20160108159 | 9/2016 |
| WO | 2017078812 | 5/2017 |

OTHER PUBLICATIONS

Zheng et al., "Micro-nano structure hard carbon as a high performance anode material for sodium-ion batteries", Scientific Reports 6, Article No. 35620 (2016).

Intercalation (chemistry) Wikipedia, https://en.wikipedia.org/wiki/Intercalation_(chemistry).

Chalcogenide Wikipedia, https://en.wikipedia.org/wiki/Chalcogenide#Dichalcogenides.

International Search Report and Written Opinion of PCT Serial No. PCT/US2018/052002 dated Nov. 15, 2018, 11 pages.

Japanese Office Action of JP Serial No. 2020-516430 dated Mar. 23, 2021, 4 pages.

Korean Office Action of KR Serial No. 10-2020-7011301 dated Apr. 29, 2022, 11 pages.

ANODE FOR FLUORIDE ION BATTERY

CROSS REFERENCE TO RELATED APPLICATION

This application is a divisional application of U.S. application Ser. No. 15/724,292, now U.S. Pat. No. 10,727,487, filed Oct. 4, 2017, which is expressly incorporated herein by reference.

BACKGROUND

An electrochemical cell, e.g. a battery, generally includes a positive electrode (cathode during discharge), a negative electrode (anode during discharge), and an electrolyte containing one or more ionic species that act as charge carriers providing ion transport between the cathode and anode. During charge and discharge of the electrochemical cell, electrodes exchange ions with the electrolyte and exchange electrons with an external circuit (e.g. a load or a charger). Many widely available battery systems are based on cation electrode reactions, with electrodes capturing or releasing a cation from an electrolyte and balancing the charge with an electron from the external circuit. Because of its very low electrochemical oxidation/reduction potential and light weight, the element lithium (Li) is commonly used in cation based battery systems. Both lithium and Li-ion batteries are commercially available and widely used.

However, the electrochemistry of lithium metal or lithium-containing electrodes presents problems for commercial use. In this respect, lithium metal is highly reactive, and precautions must be used to in order to store lithium in safe forms (e.g., intercalates), thus increasing battery weight and reducing energy density. For example, individual Li-ion batteries and Li-ion battery packs often contain expensive voltage and thermal control circuitry to shut down the battery when voltage or temperature are outside an optimal operating range.

Fluoride-anion based electrode reactions offer an alternative to lithium and lithium-ion batteries. For example, in a fluoride ion battery (FIB), an anode and cathode are physically separated from one another but in common contact with a fluoride anion conducting electrolyte. The anode and cathode are typically formed from low potential elements or compounds (e.g., metals, metal fluorides, or intercalating compositions such as graphite), where the cathode material possesses a higher potential than the anode material. Fluoride anions ($F^-$) in the fluoride anion conducting electrolyte move from the cathode to the anode during discharge, and from the anode to the cathode during charging of the battery.

Fluoride ion batteries potentially have high theoretical capacity due to their reaction mechanisms, in which both electrodes (anode and cathode) may participate in electron or ion transfer with the electrolyte.

So far, although the ideal cathode reaction, such as $Cu+2F^- \leftrightarrow CuF_2+2e^-$ for example, has been observed, the ideal anode reaction, such as $CaF_2+2e^- \leftrightarrow Ca+2F^-$ for example, has not been confirmed in non-aqueous organic electrolyte solutions because of the large overpotential of such reaction.

BRIEF DESCRIPTION

According to one aspect, an electrochemical cell comprises a cathode, an anode including a layered material selected from the group consisting of hard carbon, nitrogen doped graphite, boron doped graphite, $TiS_2$, $MoS_2$, $TiSe_2$, $MoSe_2$, $VS_2$, $VSe_2$, electrides of alkali earth metal nitrides, electrides of metal carbides, and combinations thereof, and a fluoride ion electrolyte arranged between the cathode and the anode. At least one of the cathode and the anode reversibly exchange the fluoride ions with the electrolyte during charging or discharging of the electrochemical cell.

According to another aspect, a method of making an electrochemical cell comprises preparing an anode including by a) providing a metal substrate, b) preparing a slurry in an inert atmosphere by mixing 60-95 wt % of a layered material, 1-20 wt % of a conductive carbon, and 1-20 wt % of a liquid binder, the layered material selected from the group consisting of hard carbon, nitrogen doped graphite, boron doped graphite, $TiS_2$, $MoS_2$, $TiSe_2$, $MoSe_2$, $VS_2$, $VSe_2$, electrides of alkali earth metal nitrides, electrides of metal carbides, and combinations thereof, c) depositing the slurry on the metal substrate, and d) drying the slurry in a vacuum to thereby prepare the anode. The method includes providing a fluoride ion electrolyte, and arranging the electrolyte between the anode and a cathode.

According to another aspect, a method of using an electrochemical cell comprises charging the electrochemical cell and discharging the electrochemical cell. The electrochemical cell comprises a) a cathode, b) an anode including a layered material selected from the group consisting of hard carbon, nitrogen doped graphite, boron doped graphite, $TiS_2$, $MoS_2$, $TiSe_2$, $MoSe_2$, $VS_2$, $VSe_2$, electrides of alkali earth metal nitrides, electrides of metal carbides, and combinations thereof, and c) a fluoride ion electrolyte arranged between the cathode and the anode.

DETAILED DESCRIPTION

Figure 1:
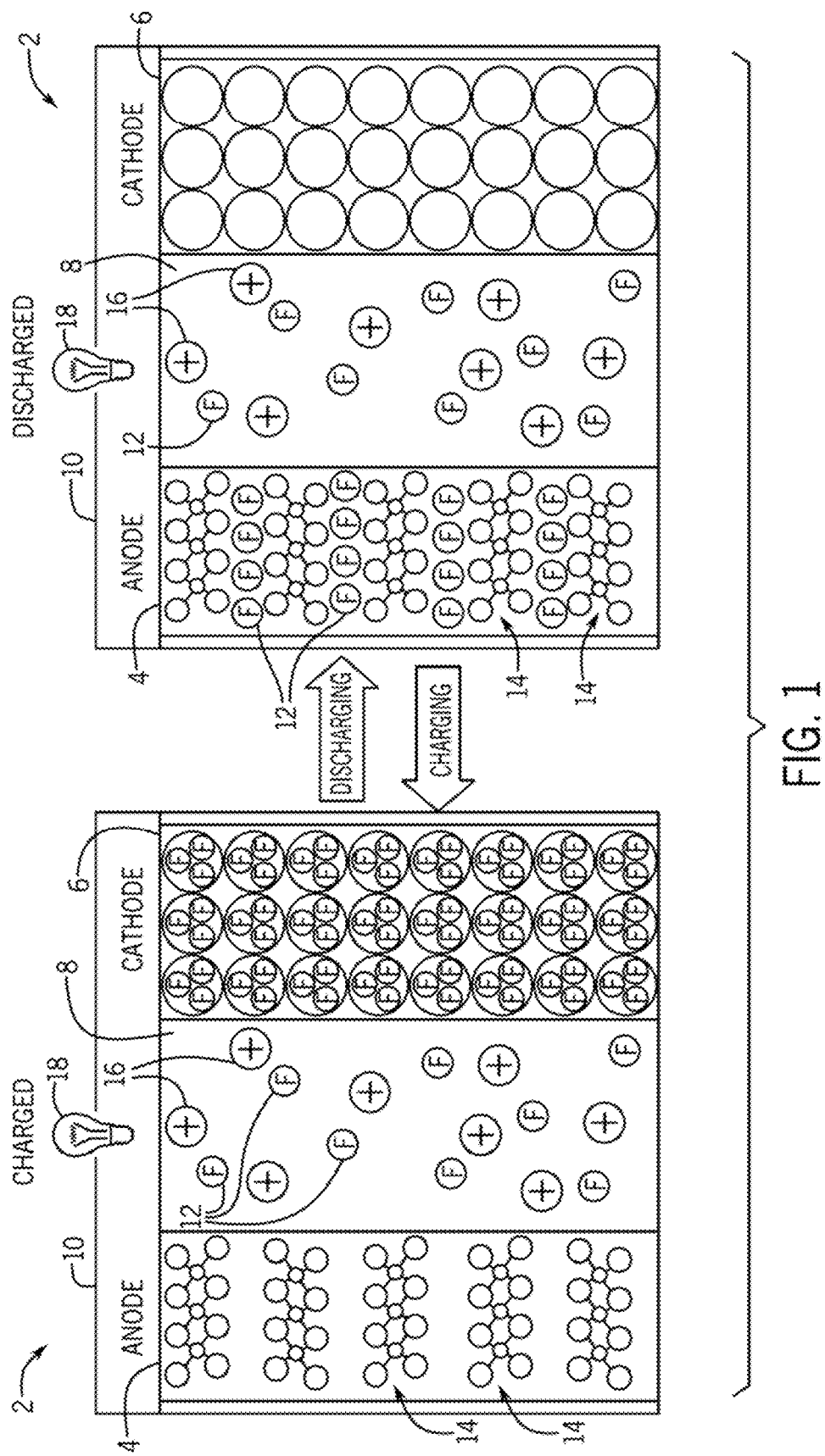
FIG. 1 is a schematic drawing of a fluoride ion electrochemical cell, with a charged cell on the left and a discharged cell on the right in accordance with the present subject matter.

The present subject matter provides a fluoride ion electrochemical cell including an anode, a cathode, and a fluoride ion electrolyte arranged between the anode and cathode. Electrochemical cells utilizing fluoride ion charge carriers of the present invention are referred to as fluoride ion electrochemical cells. The anode and cathode include host material that is configured to reversibly exchange ions with the electrolyte. In this context, "reversibly exchange" means that the host material accommodates ions from the electrolyte and releases ions from the electrolyte depending on the charging or discharging state of the electrochemical cell. "Accommodation" of ions may include intercalation of ions into the host material, insertion of ions into the host material, and/or reaction of ions with the host material. Accommodation includes alloy formation reactions, surface reaction and/or bulk reactions with the host material. "Intercalation" refers to the process where an ion inserts between layers of a layered material to generate an intercalation compound via a host/guest solid state redox reaction involving electrochemical charge transfer processes coupled with insertion of mobile guest ions, such as fluoride ions for example, into the layered material.

The anode of the fluoride ion electrochemical cell includes an active material, which includes an intercalating or layered material, and a binder. The layered material acts as a host material by intercalation of the ions within the layers of the layered material. The layered material also releases ions to the electrolyte. The anode may be arranged in a fluoride ion electrochemical cell, for example fluoride ion secondary battery.

Electrochemical Cells

The electrochemical cells of the present disclosure may include, but are not limited to, devices and/or device components that convert chemical energy into electrical energy or electrical energy into chemical energy. Electrochemical cells may include primary electrochemical cells (e.g. primary batteries), secondary electrochemical cells (e.g. secondary batteries), fuel cells, electrolysis systems, and capacitors. In one non-limiting embodiment, the electrochemical cell is a secondary battery. The electrochemical cells include electrodes and a fluoride ion electrolyte provided between the cathode and the anode where ion exchange with the electrolyte result in charge transfer processes.

The present invention provides fluoride ion primary and secondary electrochemical cells having fluoride ions ($F^-$) as the anion charge carriers. Use of fluoride ion charge carriers in electrochemical cells of the present invention provides a number of benefits. First, the low atomic mass (18.998 AMU), high electron affinity ($-328$ kJ mol$^{-1}$) of fluorine and about 6V redox voltage stability window (from $-3.03$V vs. NHE to $+2.87$V vs. NHE) of the fluoride ion ($F^-$) results in electrochemical cells having high voltage, high energy densities and high specific capacities. Second, fluoride ion has a small atomic radius and, thus, can participate in reversible insertion and/or intercalation reactions in many electrode host materials that do not result in significant degradation or significant structural deformation of the electrode host material upon cycling in secondary electrochemical cells. This property may result in secondary fluoride ion electrochemical cells having a large cycle life (e.g., greater than or equal to about 500 cycles). Third, a fluoride ion is stable with respect to decomposition at the electrode surfaces for a useful range of voltages ($-3.03$V vs. NHE to $+2.87$V vs. NHE), thereby providing enhanced performance stability and safety of electrochemical cells. Fourth, a significant number of fluoride ion host materials are available for positive electrodes that provide electrochemical cells having large specific capacities and cell voltages.

However, a wide range of anionic electrochemical cell configurations having anion charge carriers in addition to fluoride ions may be used, including but not limited to, $BF_4^-$, $PF_6^-$, $AsF_6^-$, $SbF_6^-$, $BiF_6^-$, $AlF_4^-$, $GaF_4^-$, $InF_4^-$, $TlF_4^-$, $SiF_5^-$, $GeF_5^-$, $SnF_5^-$, $PbF_5^-$, $SF_7^-$, $IF_6^-$, $ClO_4^-$, $CF_3SO_3^-$, $(CF_3SO_2)_2N^-$ and $C_4F_9SO_3^-$. Other anion charge carriers useful in electrochemical cells of the present invention include those having the formula: $C_nF_{2n+1}BF_3^{-1}$, wherein n is an integer greater than 1. Use of anion charge carriers other than fluoride ion requires incorporation of suitable host materials for positive and negative electrodes capable of accommodation of the anion charge carrier during discharge and charging, and providing a desired cell voltage and specific capacity.

In one embodiment, the present invention provides a fluoride ion secondary electrochemical cell including a positive electrode, a negative electrode including a layered material that acts as an ion host material, and an electrolyte provided between the positive electrode and the negative electrode. The electrolyte is capable of conducting ion charge carriers. The electrolyte may be an electrolyte solution including a fluoride salt, at least a portion of which is present in a dissolved state in a solvent to thereby provide fluoride ions and corresponding cations in the electrolyte solution. At least one of the positive electrode and negative electrode are capable of reversibly exchanging (i.e. accommodating and releasing) the fluoride ions with the electrolyte during charging or discharging of the electrochemical cell.

During charge and discharge of a fluoride ion electrochemical cell, fluoride ions are shuttled between the negative or positive electrodes and the electrolyte. The reversible ion exchange mechanism of these electrochemical cells gives rise to the terms "rocking chair" or "shuttle" fluoride ion electrochemical cells.

Electrodes

The electrodes are electrical conductors where ions and electrons are respectively exchanged with electrolyte and an outer circuit. The electrodes include a cathode and an anode. As used herein, "cathode" refers to the positive electrode where electrons enter the cell and reduction occurs during discharging, and "anode" refers to the negative electrode where electrons leave the cell and oxidation occurs during discharging. Although the charge on each electrode will be reversed in secondary batteries during charging (i.e. the anode becomes the positive electrode and the cathode becomes the negative electrode), the terms "anode" and "cathode" will be preserved throughout this description in order to differentiate between the two electrodes.

In the present description, "positive electrode" and "cathode" are used synonymously and refer to the electrode having the higher electrode potential in an electrochemical cell (i.e. higher than the negative electrode) during discharging. "Negative electrode" and "anode" are used synonymously in the present description and refer to the electrode having the lower electrode potential in an electrochemical cell during discharging (i.e. lower than the positive electrode). Cathodic reduction refers to a gain of electron(s) of a chemical species, and anodic oxidation refers to the loss of electron(s) of a chemical species.

The electrodes may be produced using a slurry including an active material (e.g. a layered material as the host material for the anode), a binder (which may be a polymer dissolved in a solvent), and an optional conductive diluent.

Layered Material

The anode of the present electrochemical cells includes a layered material as an ion host material. The layered material is capable of accommodating ions from the electrolyte so as to generate an ion intercalation compound. Major structural features of the layered material are preserved after insertion of the guest ions via intercalation. In some layered materials, intercalation refers to a process where guest ions are taken up within the interlayer gaps (e.g., galleries) of a layered material. The guest ion may be a fluoride ion ($F^-$) from the electrolyte, or may be the associated anion from the a fluoride salt dissolved in the solvent of the electrolyte.

Useful layered material for the anode includes, but is not limited to, hard carbon, nitrogen doped graphite, boron doped graphite, $TiS_2$, $MoS_2$, $TiSe_2$, $MoSe_2$, $VS_2$, $VSe_2$, electrides of alkali earth metal nitrides, electrides of metal carbides, and combinations thereof. The electrides of alkali earth metal nitrides include, but are not limited to, $Mg_2N$, $Ca_2N$, $Sr_2N$, and combinations thereof. The electrides of metal carbides include, but are not limited to, $Y_2C$, lanthanide carbides, and combinations thereof.

Other host materials may be used for the anode or cathode of fluoride ion electrochemical cells of the present disclosure, including those materials capable of accommodating fluoride ions or cations from the electrolyte during discharge and charging of the electrochemical cell. Use of fluoride ion host materials that are capable of reversibly exchanging fluoride ions with the electrolyte without significant degradation of the fluoride ion host material upon cycling is preferred for the anode of the secondary fluoride ion batteries.

In addition to the layered material, the anode of the present disclosure may additionally comprise a fluoride ion host material, such as a fluoride compound, having a low standard reduction potential, preferably less than or equal to about $^-1$ V for some applications, and more preferably less than or equal to about $^-2$ V for some applications. Useful additional fluoride ion host materials for the anode besides the layered material include, but are not limited to $LaF_x$, $CaF_x$, $AlF_x$, $EuF_x$, $LiC_6$, $Li_xSi$, $Li_xGe$, $Li_x(CoTiSn)$, $SnF_x$, $InF_x$, $VF_x$, $CdF_x$, $CrF_x$, $FeF_x$, $ZnF_x$, $GaF_x$, $TiF_x$, $NbF_x$, $MnF_x$, $YbF_x$, $ZrF_x$, $SmF_x$, $LaF_x$ and $CeF_x$. Other additional fluoride host materials for the anode may be metal fluorides $MF_x$, where M is an alkali-earth metal (Mg, Ca, Ba), M is a transition metal, M belongs to column 13 group (B, Al, Ga, In, Tl), or M is a rare-earth element (atomic number Z between 57 and 71). The additional fluoride ion host materials may also comprise a polymer(s) capable of reversibly exchanging fluoride ion charge carriers. Examples of such polymers include, but not limited to, polyacetylene, polyaniline, polypyrrole, polythiophene and polyparaphenylene.

In an embodiment, a cathode of a fluoride ion electrochemical cell of the present disclosure comprises a fluoride ion host material, such as a fluoride compound, having a high standard reduction potential, preferably for some applications greater than or equal to about 1V, and more preferably for some applications greater than or equal to about 2 V.

Useful fluoride ion host materials for a cathode of electrochemical cells of the present disclosure include, but are not limited to, $CF_x$, $AgF_x$, $CuF_x$, $NiF_x$, $CoF_x$, $PbF_x$, $CeF_x$, $MnF_x$, $AuF_x$, $PtF_x$, $RhF_x$, $VF_x$, $OsF_x$, $RuF_x$, and $FeF_x$. The host material of the cathode may also include a subfluorinated carbonaceous material having a formula $CF_x$, where x is the average atomic ratio of fluorine atoms to carbon atoms and is selected from the range of about 0.3 to about 1.0. Carbonaceous materials useful for cathodes of this embodiment are selected from the group consisting of graphite, graphene, coke, single or multi-walled carbon nanotubes, multi-layered carbon nanofibers, multi-layered carbon nanoparticles, carbon nanowhiskers and carbon nanorods. The present disclosure also includes cathode fluoride ion host materials comprising a polymer(s) capable of reversibly exchanging fluoride ions comprising the anion ion charge carriers. Examples of conjugated polymers for positive electrodes include, but not limited to, polyacetylene, polyaniline, polypyrrole, polythiophene and polyparaphenylene. In one embodiment, the cathode comprises or consists of a transition metal fluoride, for example copper (II) fluoride ($CuF_2$).

Conductive Diluent

The anodes and cathodes of the present electrochemical cells may further include an inert conductive diluent, such as acetylene black, carbon black, powdered graphite, coke, carbon fiber, and metallic powder, and/or may further comprises a binder, such as a polymer binder.

Binders

The binder used to form the electrodes is not particularly limited by the present subject matter and may include various polymer materials. Useful binders for the electrodes may include, but are not limited to, a fluoropolymer such as polyvinylidene difluoride (PVDF), polyimide, polyacrylic acid, polyurethane, a mixture of carboxymethyl cellulose and styrene-butadiene rubber, polytetrafluoroethylene, and combinations thereof.

Solvent

The binder may be in liquid form, wherein the polymer material is dissolved in a solvent, herein referred to as a "liquid binder." The solvent is not particularly limited by the present subject matter, and may include any solvent capable of dissolving the binder. Useful solvents include but are not limited to N-Methyl-2-pyrrolidone (NMP), water, alcohols such as methanol, ethanol, n-propanol, isopropanol, n-butanol, isobutanol, sec-butanol, tert-butanol, n-amyl alcohol, isoamyl alcohol, sec-amyl alcohol, tert-amyl alcohol, 1-ethyl-1-propanol, 2-methyl-1-butanol, n-hexanol and cyclohexanol; ketones such as methyl ethyl ketone, methyl isobutyl ketone, ethyl butyl ketone, and cyclohexanone; ethers such as tetrahydrofuran and dioxane; esters such as ethyl acetate, n-propyl acetate, isopropyl acetate, n-butyl acetate, isobutyl acetate, sec-butyl acetate, 3-methoxybutyl acetate, methyl propionate, ethyl propionate, diethyl carbonate, and dimethyl carbonate; glycol derivatives such as ethylene glycol monomethyl ether, ethylene glycol monoethyl ether, ethylene glycol monopropyl ether, ethylene glycol monobutyl ether and ethylene glycol ethyl ether acetate; 1-methoxy-2-propanol; 1-ethoxy-2-propanol; 3-methoxy-3-methyl-1-butanol; methoxybutanol; acetonitrile; dimethylformamide; dimethylacetamide; diacetone alcohol; ethyl acetoacetate; 1,2-dimethylglycerin; 1,3-dimethylglycerin; trimethylglycerin; and N-methylpyrrolidone, and combinations thereof. In one embodiment, the binder is in liquid form and includes PVDF as the polymer material and NMP as the solvent.

After the slurry is formed, including the addition of a liquid binder with other constituents, additional solvent may be added to the slurry for modifying or adjusting the viscosity of the slurry during the process of formation of the electrodes.

As is described in more detail herein, the slurry may be applied to a substrate and dried to remove the solvent to thereby provide an anode including the layered material.

Electrolyte

In an embodiment, electrochemical cells operate on the principle of simultaneous oxidation and reduction reactions that involve accommodation and release of anion or cation charge carriers by positive and negative electrodes comprising different anion and cation host materials. In these systems, the electrolyte solution provides for transport of anion charge carriers (e.g., fluoride ions) or cation charge carriers between positive and negative electrodes during discharge and charging of the electrochemical cell. For example, when utilized in electrochemical cells, embodiments of the disclosed electrolyte solutions may provide conductivity of fluoride ions greater than or equal to 0.1 mS/cm at 25° C.

For fluoride anion (F⁻) based electrolytes, the electrochemical reactions at the electrodes may be anion based. In such situations, and for the purpose of illustration, in the following equations A⁻ is the anion charge carrier (e.g. F⁻), $PA_n$ is the cathode anion host material, and $NA_m$ is the anode anion host material.

In a primary battery, only discharge reactions occur. As such, at the cathode, A⁻ is released according to Equation 1:

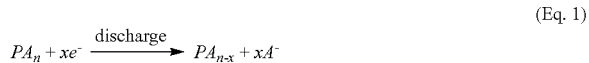

(Eq. 1)

$$PA_n + xe^- \xrightarrow{discharge} PA_{n-x} + xA^-$$

At the anode, A⁻ is occluded according to Equation 2:

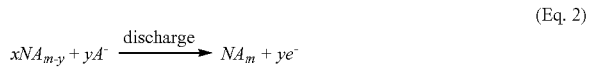

(Eq. 2)

$$xNA_{m-y} + yA^- \xrightarrow{discharge} NA_m + ye^-$$

Accordingly, the cell overall reaction proceeds according to Equation 3.

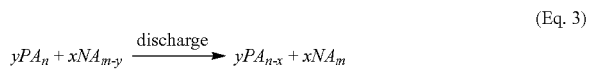

(Eq. 3)

$$yPA_n + xNA_{m-y} \xrightarrow{discharge} yPA_{n-x} + xNA_m$$

In a secondary battery, Equations 1 and 2 are reversed during charge, therefore the overall cell reaction proceeds according to Equation 4:

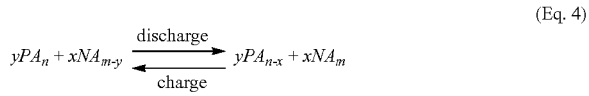

(Eq. 4)

$$yPA_n + xNA_{m-y} \underset{charge}{\overset{discharge}{\rightleftarrows}} yPA_{n-x} + xNA_m$$

Electrolytes for the fluoride ion electrochemical cells may include aqueous electrolytes or nonaqueous electrolytes. Useful electrolyte compositions for anionic electrochemical cells preferably have one or more of the following properties. First, electrolytes for some applications preferably have a high ionic conductivity with respect to the anion charge carrier, for example to fluoride ions. Some electrolytes useful in the present invention may comprise solvents, solvent mixtures and/or additives providing conductivity for an anion charge carrier, such as a fluoride ion charge carrier, greater than or equal to 0.0001 S cm⁻¹, greater than or equal to 0.001 S cm⁻¹, or greater than or equal to 0.005 S cm⁻¹. Second, the solvent of the electrolyte may be capable of dissolving an electrolyte salt, such as a fluoride salt, so as to provide a source of anion charge carriers at a useful concentration in the electrolyte. Third, electrolytes are preferably stable with respect to decomposition at the electrodes. For example, electrolytes comprise solvents, electrolyte salts, additives and anion charge carriers that are stable at high electrode voltages, such as a difference between positive and negative electrode voltages equal to or greater than about 4.5V. Fourth, electrolytes preferably for some applications exhibit good safety characteristics, such as flame retardance.

The electrolyte of the present electrochemical cells may include a solid phase electrolyte, such as lanthanum trifluoride, or liquid phase electrolyte. The electrolyte may comprise non-aqueous fluoride ion electrolyte solutions disclosed in U.S. Patent Application Publication No. 2017/0062874, which is incorporated herein by reference.

In a non-limiting embodiment, an electrolyte of a fluoride ion electrochemical cell includes a solvent and a fluoride salt, wherein the fluoride salt is at least partially present in a dissolved state in the solvent so as to generate fluoride ions in the electrolyte.

A schematic illustration of an embodiment of a fluoride ion electrochemical cell 2 is presented in FIG. 1, including an anode 4, a cathode 6, an electrolyte 8 arranged between and in common contact with the anode 4 and cathode 6, and an external circuit 10 connecting between the anode 4 and cathode 6. During discharge (i.e. transitioning from the left drawing to the right drawing in FIG. 1), fluoride anions 12 are released from the cathode 6, which is for example $CuF_2$, migrate through the electrolyte 8, and are accommodated by the anode 4. As depicted in the right drawing in FIG. 1, the fluoride anions 12 are accommodated by intercalation in the layered material 14 of the anode 4. As should be appreciated, the electrolyte may also include cations 16, and the direction of the flow of electrons through the external circuit 10 during discharge is from the anode 4 to the cathode 6, which may be used to power an external load 18.

During charging (i.e. transitioning from the right drawing to the left drawing in FIG. 1), fluoride anions 12 are released from between the layered material 14 of the anode 4, migrate through the electrolyte 8, and are accommodated by the cathode 6. As depicted, the fluoride ions 12 are accommodated by reacting with the cathode 6 host material, which may be a copper containing material, to form a $CuF_2$. The direction of the flow of electrons through the external circuit 10 during charging is from the cathode 6 to the anode 4, which may require the use of a recharging device connected to the external circuit 10 in order to drive this mechanism. Release and accommodation of fluoride ions during discharge and charging results from oxidation and reduction reactions occurring at the electrodes, i.e. anion based reactions.

In another embodiment, the electrochemical reactions at the electrodes may be anion and cation based reactions, i.e. "dual-ion" based reactions. An example of a dual-ion electrochemical cell 22 is depicted for example in FIG. 2, which includes an anode 24, a cathode 26, an electrolyte 28 arranged between and in common contact with the anode 24 and cathode 26, and an external circuit 30 connecting between the anode 24 and cathode 26. During charging (i.e. transitioning from the right drawing to the left drawing in FIG. 2), fluoride anions 32 in the electrolyte 28 are accommodated by the cathode 26. As depicted, the fluoride anions 32 react with a copper containing material of the cathode 26 for example, to make an alloy of $CuF_2$. At the same time, cations 34 in the electrolyte 28 are accommodated by intercalation in the layered material 36 of the anode 24. The direction of the flow of electrons through the external circuit 30 during charging is from the cathode 26 to the anode 24, which may require the use of a recharging device connected to the external circuit 30 in order to drive this mechanism.

Figure 2:
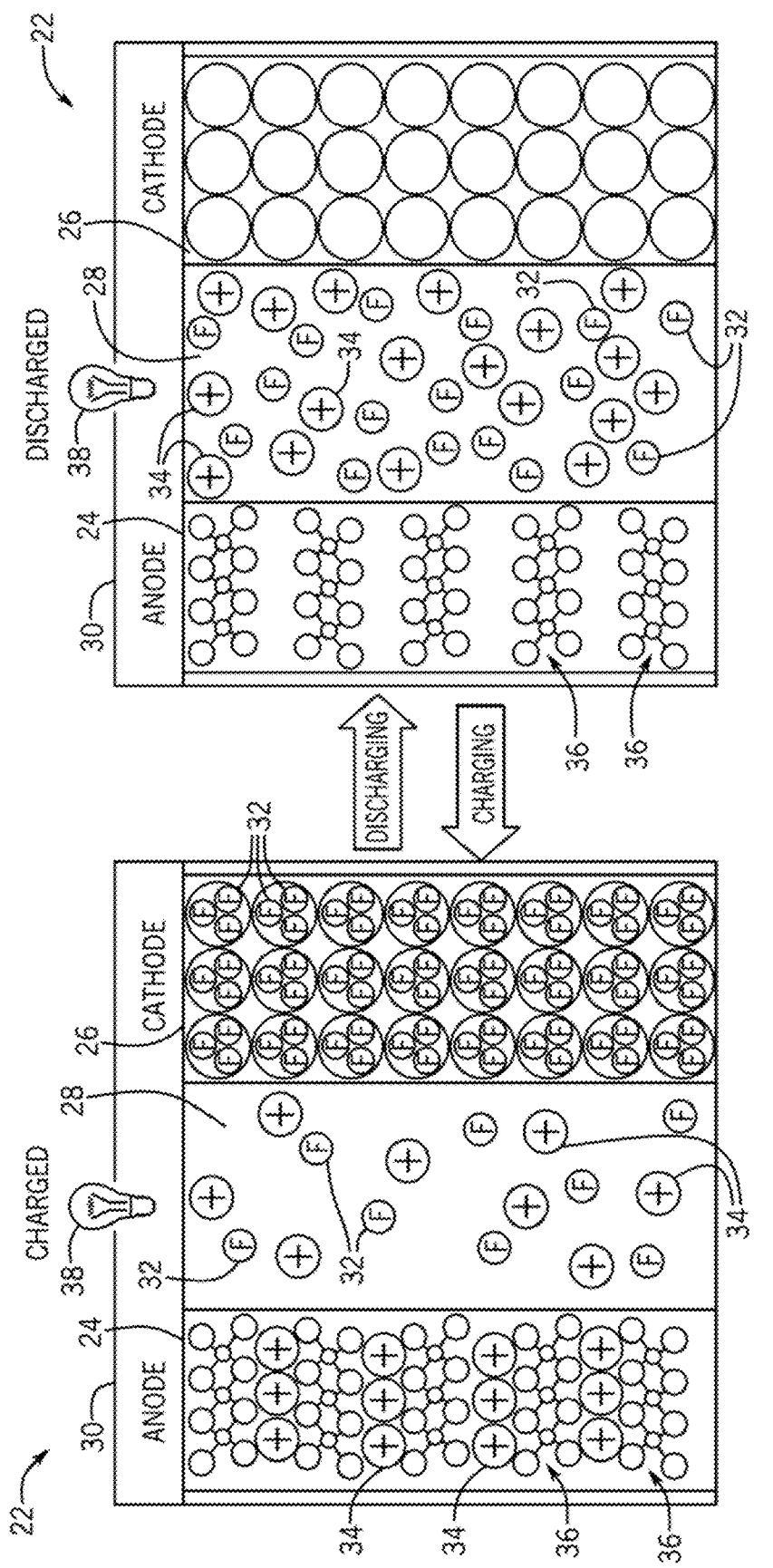
FIG. 2 is a schematic drawing of another fluoride ion electrochemical cell, with a charged cell on the left and a discharged cell on the right in accordance with the present subject matter.

During discharging (i.e. transitioning from the left drawing to the right drawing in FIG. 2), fluoride anions 32 are released from the cathode 26 and into the electrolyte 28. At the same time, cations 34 are released from the layered material 36 of the anode 24 and into the electrolyte 28. In other words, the discharge process is the reverse of the charge process, where both fluoride anions 32 and cations 34 diffuse back into the electrolyte 28 from the respective electrodes. As should be appreciated, the direction of the flow of electrons through the external circuit 30 during discharge is from the anode 24 to the cathode 26, which may be used to power an external load 38.

The type of reactions at the electrodes, whether they are anion based or dual-ion based reactions, may depend on the layered material used for the anode. In one embodiment, the layered material of the anode includes $Ca_2N$, or $Y_2C$ and the reactions at the electrodes are anion based reactions. In another embodiment, the layered material of the anode includes nitrogen or boron doped graphite, $TiS_2$, or $MoS_2$ and the reactions at the electrodes are dual-ion based reactions.

Solvent

In several embodiments, the electrolyte is a liquid and includes a solvent and a dissolved species in the solvent. The solvent may include, but is not limited to bis(2,2,2-trifluoroethyl) ether (BTFE); Tris(2,2,2-trifluoroethyl)phosphite (TTFP); 2,2,2-trifluoroethyl trifluoroacetate; methoxyacetonitrile (MeOAN); 3-methoxypropionitrile (3-MeOPN); Fluoroethylene carbonate (FEC); phenyl trifluoroacetate (PhTFA); 2,3-difluorobenzonitrile (2,3-$F_2$BN); 2,6-difluoropyridine (2,6-$F_2$Py); 3-fluorobenzonitrile (3-FBN); (Dimethylamino)acetonitrile (DMAN); 2-fluorobenzonitrile (2-FBN); 1,3-Dimethyl-3,4,5,6-tetrahydro-2(1H)-pyrimidinone (DMPU); Propionitrile (PN); or combinations thereof.

Other useful solvents for electrolytes of the present invention that are capable of at least partially dissolving electrolyte salts, such as fluoride salts, include but are not limited to one or more solvent selected from the group consisting of propylene carbonate, nitromethane, Toluene (tol); ethylmethyl carbonate (EMC); Propylmethyl carbonate (PMC); Diethyl carbonate (DEC); Dimethyl carbonate (DMC); Methyl butyrate (MB); n-Propyl acetate (PA); Ethyl acetate (EA); Methyl propionate (MP); Methyl acetate (MA); 4-Methyl-1,3-dioxolane (4MeDOL)($C_4H_8O_2$); 2-Methyltetrahydrofuran (2MeTHF)($C_5H_{10}O$); 1,2 Dimethoxyethane (DME); Methyl formate (MF)($C_2H_4O_2$); Dichloromethane (DCM); γ-Butyrolactone (γ-BL)($C_4H_6O_2$); Propylene carbonate (PC)($C_4H_6O_3$); Ethylene carbonate (EC)($C_3H_4O_3$);

Other examples of suitable solvents include one or more of acetone, acetonitrile, benzonitrile, 4-fluorobenzonitrile, pentafluorobenzonitrile, triethylamine, diisopropylethylamine, 1,2-dimethoxyethane, ethylene carbonate, propylene carbonate, γ-butyrolactone, dimethyl carbonate, diethyl carbonate, methyl ethyl carbonate, propyl methyl carbonate, tetrahydrofuran, 2-methyltetrahydrofuran, nitromethane, benzene, toluene, chloroform, dichloromethane, 1,2-dichloroethane, dimethylsulfoxide, sulfolane, N, N-dimethylformamide, N, N-dimethylacetamide, carbon disulfide, ethyl acetate, methyl butyrate, n-propyl acetate, methyl propionate, methyl formate, 4-methyl-1,3,-dioxolane, pyridine, methyl isobutyl ketone, methyl ethyl ketone, hexamethylphosphoramide, hexamethylphosphorus triamide, 1-methyl-2-pyrrolidinone, 2-methoxyethyl acetate, and substituted derivatives thereof, as well as sulfones such as ethylmethylsulfone, trimethylene sulfone, 1-methyltrimethylene sulfone, ethyl-sec-butyl sulfone, 3,3,3-trifluoropropylmethyl sulfone, 2,2,2-trifluoroethyl sulfone, and combinations thereof.

In one non-limiting example, the solvent comprises or consists of bis(2,2,2-trifluoroethyl) ether (BTFE), represented by the following chemical formula:

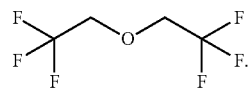

Dissolved Species

The dissolved species in the electrolyte can be any material that provides fluoride anions in the electrolyte, and may also provide a cation useful as a charge carrier in a dual-ion based reactions. The dissolved species may include, but is not limited to, one or more neo-pentyl fluoride salts, including (neo-pentylamine)trimethylammonium fluoride, also known as $NpMe_3NF$ or (2,2,dimethylpropyl)trimethylammonium fluoride and represented by the following chemical formula

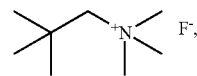

bis((neo-pentylamine)dimethylammonium fluoride, also known as $Np_2Me_2NF$ or bis(2,2-dimethylpropyl)dimethylammonium fluoride and represented by the following chemical formula

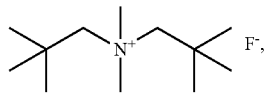

and fluoride salts having the formula $MF_n$, wherein M is a metal, and n is an integer that will result in a concentration of fluoride salt in the electrolyte of greater than 0.05M. The metal (M) may be an alkali metal, such as Na, K or Rb, or M is an alkaline earth metal, such as Mg, Ca or Sr, or may be a metal other than lithium so as to provide enhanced safety and stability relative to conventional state of the art lithium batteries and lithium ion batteries. In one embodiment, the electrolyte is free of intentionally added lithium and free of intentionally added lithium ions. In some embodiments, the concentration of the fluoride salt in the electrolyte is selected from the range of about 0.1 M to about 2.0M.

In one embodiment, the dissolved species includes one or both of $NpMe_3NF$ and $Np_2Me_2NF$. When dissolved in a solvent, $NpMe_3NF$ provides a fluoride anion ($F^-$) and a (neo-pentylamine)trimethylammonium cation ($NpMe_3N^+$) in the electrolyte. When dissolved in a solvent, $Np_2Me_2NF$ provides a fluoride anion and a bis(2,2-dimethylpropyl)dimethylammonium cation ($Np_2Me_2N^+$) in the electrolyte.

The dissolved species can additionally or alternatively include other fluoride salts that may be anhydrous, including one or more of tetramethylammonium fluoride (TMAF), 1-adamantyltrimethylammonium fluoride, phenyltrimethylammonium fluoride, hexamethylguanidinium fluoride, 1-propyl,1-methyl-piperidinium fluoride, 1,3,3,6,6,-hexamethylpiperidinium fluoride, 1-methylhexamethylenetetramine fluoride, 1,1,1,3,3,3-hexakis(dimethylamino) diphosphazenium fluoride, tetrakis[tris(dimethylamino)-phosphoranylidenamino] phosphonium fluoride, tetramethylphosphonium fluoride, tetraphenylphosphonium fluoride, phenyltrimethylphosphonium fluoride, and poly(1,1-dimethyl-3,5-dimethylene piperidinium)fluoride.

In several embodiments, the dissolved species and electrolyte are free of lithium.

Method of Producing an Anode

Positive and negative electrodes of the present electrochemical cell may be provided in a range of useful configurations and form factors as known in the art of electrochemistry and battery science, including thin electrode designs, such as thin film electrode configurations.

For some embodiments, an anode is typically fabricated by providing a metal substrate upon which a slurry of active material will be deposited and dried. The metal substrate may act as a current collector in the electrochemical cell. In one non-limiting example, the metal substrate comprises a metal mesh, for example a stainless steel mesh with a size of about 5×20 mm. However, any metal mesh may be used including those made of aluminum for example. A metal mesh may provide a strong bond with the active material and binder of the anode, wherein the voids in the mesh accept the slurry, and once the slurry is dried, an interlocking matrix of the anode material is intermingled with the metal mesh. Such arrangement therefore may inhibit detachment of the anode from the metal substrate. Alternatively, a metal foil or plate may also be used as the metal substrate.

In a non-limiting example method, the metal substrate is cleaned by sonication in an ethanol bath and dried in a vacuum oven at about 100° C. The metal substrate may be weighed for later comparison with the final weight of the anode.

A slurry including the active material may be prepared in an inert atmosphere, for example an Argon filled glove box. In a non-limiting embodiment, the slurry is prepared by uniformly mixing a layered material as the active material, a conductive diluent (e.g. conductive carbon), and a liquid binder. The layered material may be included at 60-95 wt %, 80-95 wt %, or 80 wt %±1 wt % of the slurry. The layered material may be subjected to grinding, for example in a mortar or grinder before mixing, in order to produce a more uniform particle size distribution. The conductive diluent (e.g. conductive carbon) may be included at 1-20 wt %, 7.5-12.5 wt %, or 10 wt %±1 wt % of the slurry. The liquid binder may be included at 1-20 wt %, 7.5-12.5 wt %, or 10 wt %±1 wt % of the slurry. The liquid binder may include a polymer material dissolved in a solvent. The solid content (i.e. polymer material content) of the liquid binder is not particularly limited, and may range from about 1-50 wt %, 5-20 wt %, or about 11-13 wt %. The polymer material in the liquid binder may be selected from the group consisting of polyvinylidene difluoride, polyimide, polyacrylic acid, polyurethane, a mixture of carboxymethyl cellulose and styrene-butadiene rubber, polytetrafluoroethylene, and combinations thereof; and the solvent may include N-methyl-2-pyrrolidone.

In one embodiment, the liquid binder includes polyvinylidene difluoride (PVDF) or polyimide polymer material dissolved in N-Methyl-2-pyrrolidone (NMP) solvent. The amount of N-Methyl-2-pyrrolidone (NMP) solvent is not particularly limited, and may be included in an amount to provide a certain viscosity as desired for a particular application technique. Additional solvent, for example N-Methyl-2-pyrrolidone (NMP), may be periodically added to the slurry to adjust its viscosity before and during application to the metal substrate.

Once prepared, the slurry is applied to the metal substrate and dried thereon, for example in a vacuum chamber for about 12 hours in order to evaporate the solvent from the slurry and thereby leave a coherent mass of active material and binder in electrical contact with the metal substrate, wherein the active material (including the layered material), the conductive carbon, and the binder of the anode is bonded to the metal substrate. Alternatively, the slurry may be dried after application to the metal substrate at about 110° C. for about 10 minutes, followed by further drying in a chemical dryer with the application of heat at 300° C. under an Argon atmosphere for about 1.5 hours. The anode may be weighed and compared with the initial weight of the metal substrate in order to determine the weight of the active material, binder and optional conductive carbon present in the anode. A cathode of the electrochemical cell may be formed in a similar manner as described herein with respect to the anode.

The method may further include providing an electrolyte including fluoride anions and arranging the electrolyte between and in common contact with the anode and a cathode in order to produce an electrochemical cell.

In another aspect, the present invention provides a method for making an electrochemical cell comprising the steps of: (i) providing a cathode; (ii) providing a anode, for example by preparing the anode as described herein; and (iii) providing an electrolyte between the positive electrode and the negative electrode, wherein the electrolyte is capable of conducting anion charge carriers; wherein at least one of the cathode and the anode are capable of reversibly exchanging the anion charge carriers with the electrolyte during charging or discharging of the electrochemical cell.

Method of Using EC Cell

In one embodiment, a method of using an electrochemical cell comprises charging the electrochemical cell and discharging the electrochemical cell, wherein the electrochemical cell comprises a) a cathode, b) an anode including a layered material selected from the group consisting of hard carbon, nitrogen doped graphite, boron doped graphite, $TiS_2$, $MoS_2$, $TiSe_2$, $MoSe_2$, $VS_2$, $VSe_2$, electrides of alkali earth metal nitrides, electrides of metal carbides, and combinations thereof, and c) an electrolyte including fluoride anions and arranged between the cathode and the anode.

In another aspect, the present invention provides a method for generating an electrical current, the method comprising the steps of (i) providing an electrochemical cell; the electrochemical cell comprising a cathode, an anode, and an electrolyte provided between the cathode and the anode. The electrolyte is capable of conducting anion charge carriers. At least one of the cathode and anode are capable of reversibly exchanging the anion charge carriers with the electrolyte during charging or discharging of the electrochemical cell. The method includes (ii) discharging the electrochemical cell. The method may further comprise the step of charging the electrochemical cell. In some embodiments the anion charge carrier is fluoride ion ($F^-$).

EXAMPLES

Figure 3:
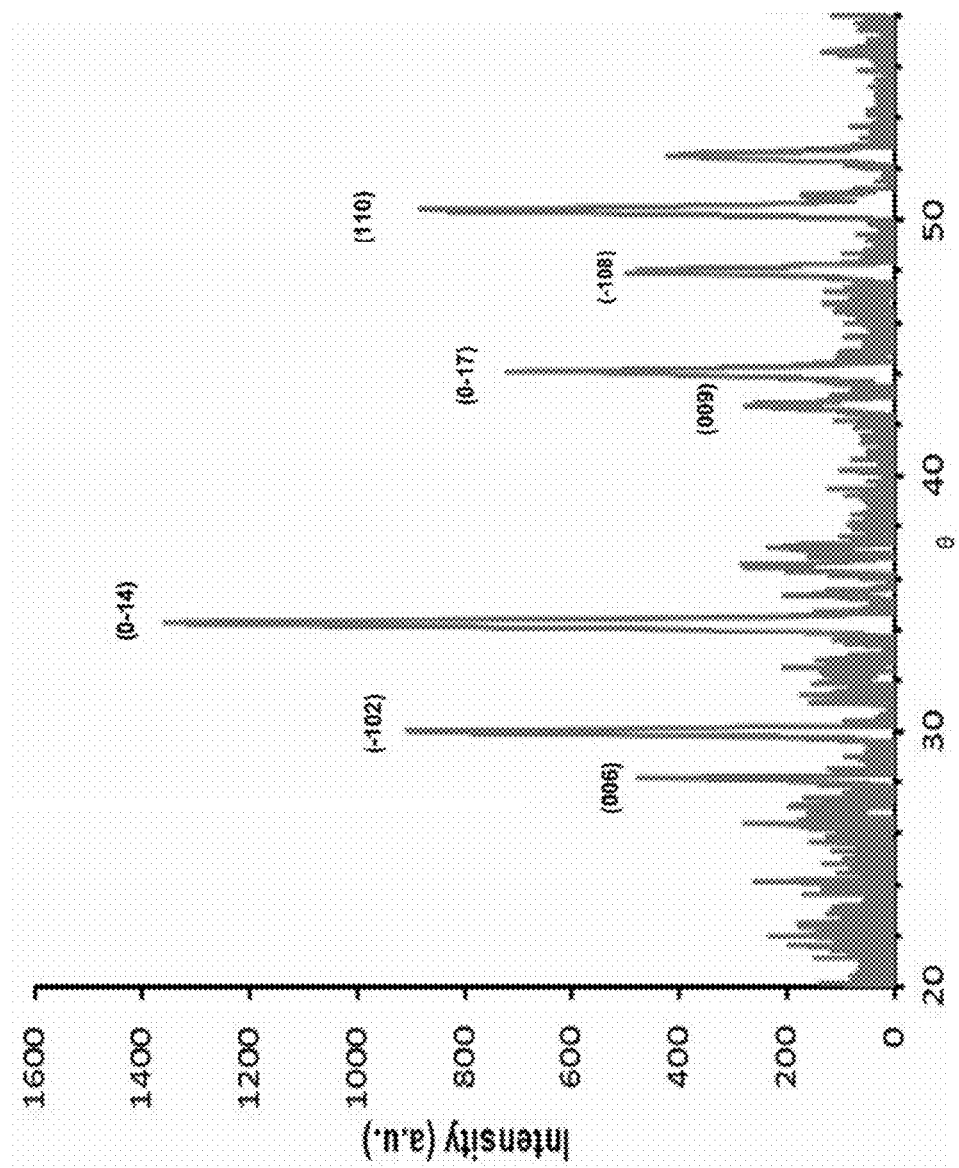
FIG. 3 is a XRD spectrum of an example synthesized layered material in accordance with the present subject matter.

The following examples illustrate, but in no way limit, the invention. In one example, a layered material of $Ca_2N$ electride material was synthesized by the reduction of $Ca_3N_2$ with Ca metal. Raw materials included 1.679 g $Ca_3N_2$ and 0.503 g of 9 mesh Ca granules to give a Ca:N ratio of 2.05:1 for the raw materials. The raw materials were placed in a hydraulic press under vacuum and pressed at 9,600 lbs for 3 minutes and at 10,400 lbs for 1 minute, which produced a pellet of 1.222 g, which was a 44% weight loss of material. The pellet was placed in a molybdenum foil boat and sealed in a quartz tube and heated in a furnace equipped with insulating plugs, thereby producing a blue-grey powder comprising 1.003 g $Ca_2N$. A powder X-ray diffraction pattern of the synthesized $Ca_2N$ was obtained and is shown in FIG. 3, which matches the theoretical pattern of $Ca_2N$.

Figure 4:
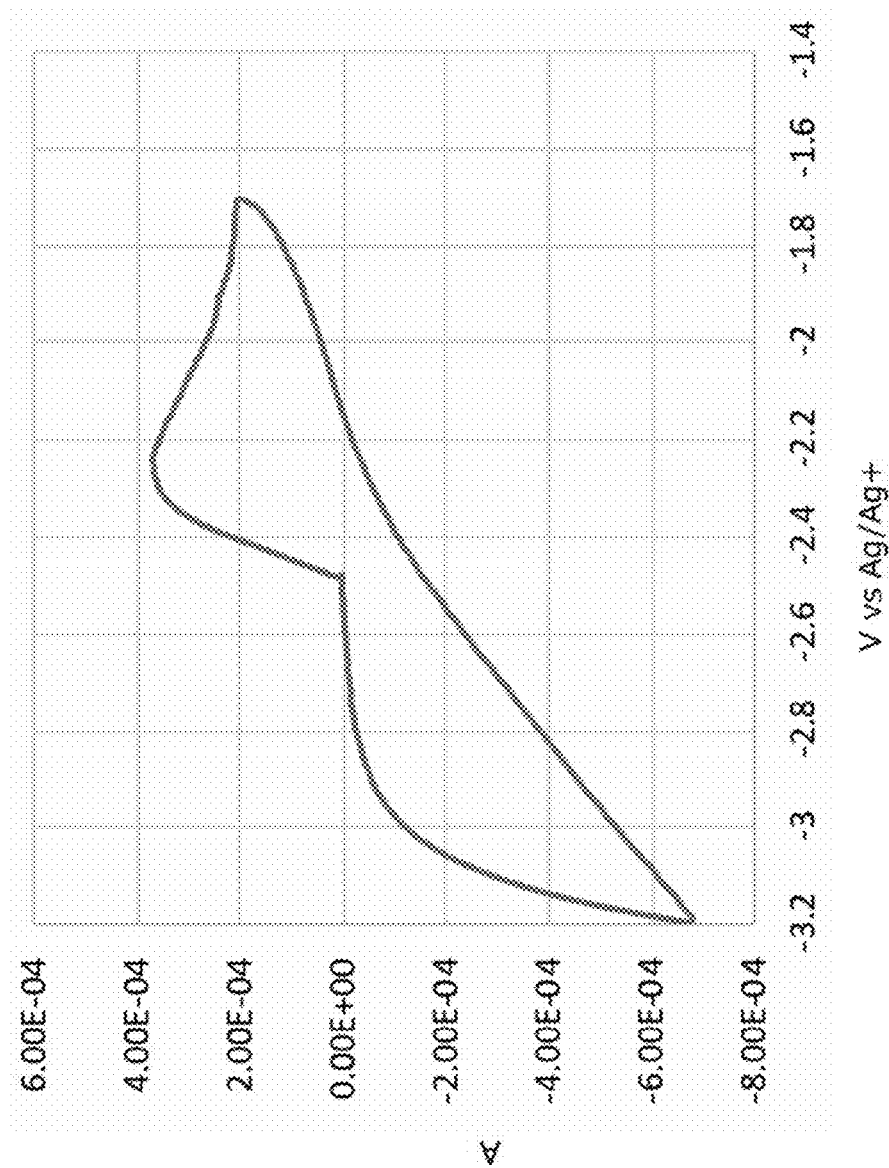
FIG. 4 is a graph showing the result of an electrochemical test performed on an anode made in accordance with the present subject matter including the synthesized layered material of FIG. 3.

The $Ca_2N$ was then prepare into an anode along with graphite and polyimide binder, and subject to an electrochemical test. The electrochemical test included the use of $Ag/Ag^+$ as a reference electrode, Pt wire as a counter electrode, and a 1 M solution of $NpMe_3NF$ in bis(2,2,2-trifluoroethyl) ether (BTFE) as the electrolyte. The electrochemical test was performed at a scan rate of 0.5 mV/s, 5 cycles, and a stop at −3.5V vs. the $Ag/Ag^+$ reference electrode. The results of the electrochemical test are depicted in FIG. 4, which shows that the $Ca_2N$ anode operates to reversibly accommodate and release conducting ions from an electrolyte, with a reaction mechanism of fluoride ion insertion/extraction into the lattice of the $Ca_2N$.

Figure 5:
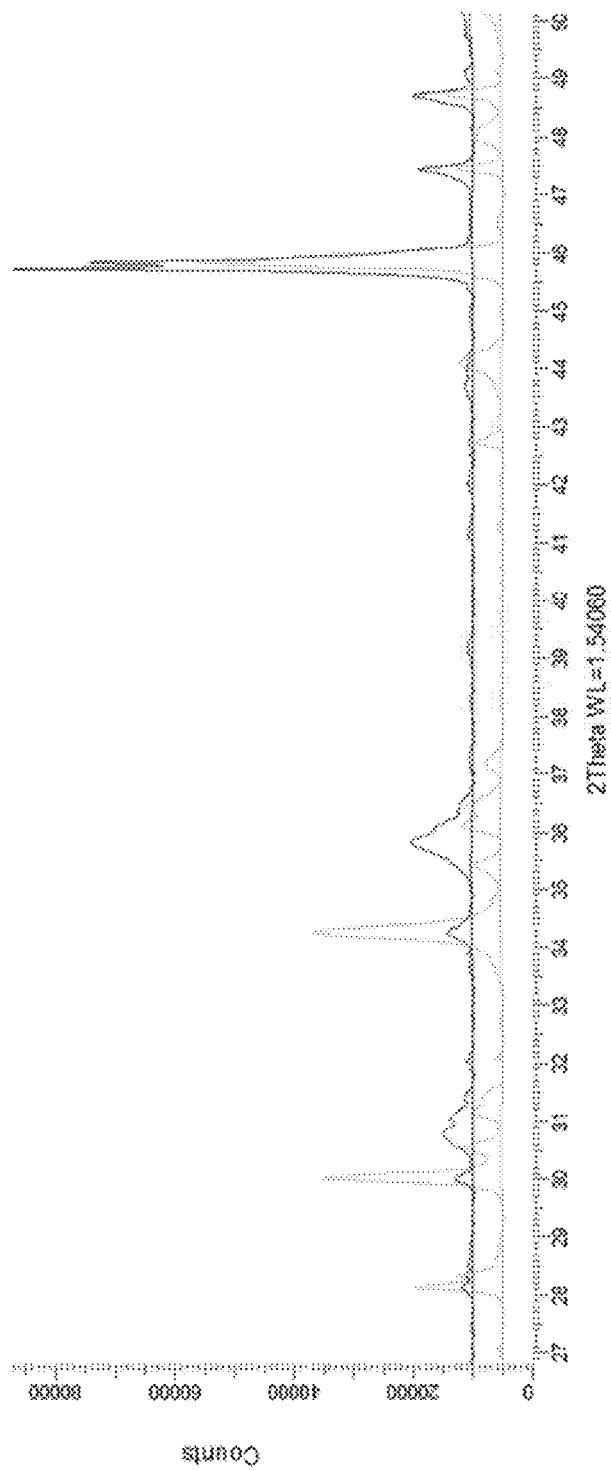
FIG. 5 is a comparison of two XRD spectra of the anode of FIG. 4 taken before and after an electrochemical test in accordance with the present subject matter.

The material of the anode after fluorination was analyzed by XRD and the graph was compared to the initial XRD of the $Ca_2N$. The comparison is shown in FIG. 5, which includes an initial spectrum on the bottom and a subsequent spectrum on the top taken after the electrochemical test. The evolved peak of FIG. 5 indicate that fluorine got into the lattice of the $Ca_2N$ layered material during the electrochemical test.

Figure 7:
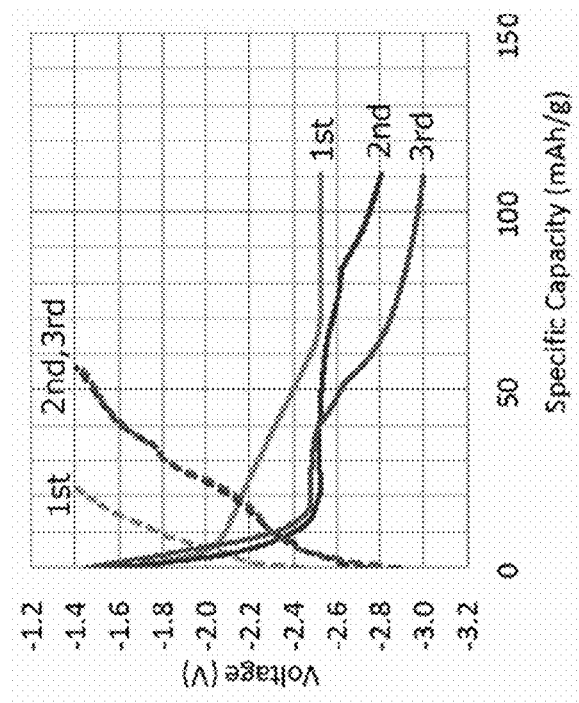
FIG. 7 is a graph showing results of a Charge/Discharge test performed on the anode of FIG. 6 in accordance with the present subject matter.
Figure 6:
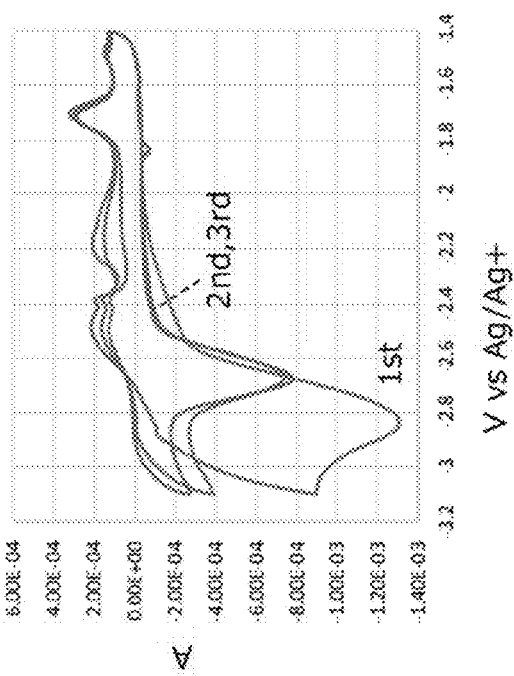
FIG. 6 is a graph showing the result of an electrochemical test performed on another example anode in accordance with the present subject matter.

In another example, 78.93 wt % $MoS_2$ was then prepare into an anode along with 9.87 wt % carbon black (Super P® available from AlfaAesar) and 11.2 wt % polyvinylidene difluoride (PVDF) binder, and subject to a cyclic voltammetry electrochemical test. The electrochemical test included the use of $Ag/Ag^+$ as a reference electrode, Pt wire as a counter electrode, and a 1 M solution of $NpMe_3NF$ in bis(2,2,2-trifluoroethyl) ether (BTFE) as the electrolyte. The electrochemical test was performed at a scan rate of 0.5 mV/s, 10 cycles, and with an open circuit voltage with a stop at a lower cut-off potential of −3.1V and then to an upper cut-off potential of −1.4V vs. $Ag/Ag^+$. The results of the electrochemical test are depicted in FIG. 6, which shows that the $MoS_2$ anode operates to reversibly accommodate and release conducting ions from an electrolyte, with a reaction mechanism of fluoride ion insertion/extraction into the lattice of the $MoS_2$. The $MoS_2$ anode was subject to a Charge/Discharge test, the results of three cycles of which are depicted in FIG. 7. In the Charge/Discharge test, 10 cycles were performed and discharging was performed at constant current at −20 ρA, with a cut-off potential of −3V. Charging was performed at constant current at 20 ρA with acut-off potential of −1.4V.

Figure 8:
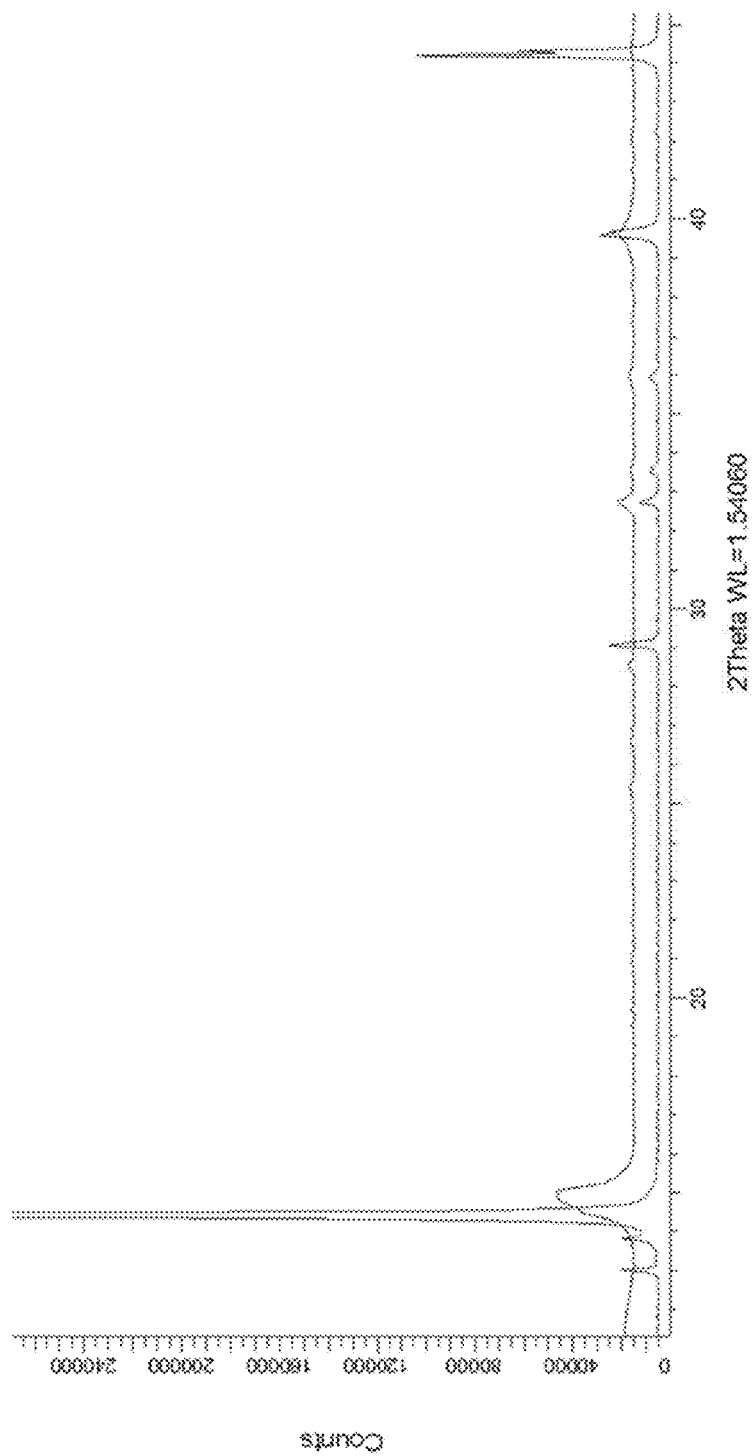
FIG. 8 is a comparison of two XRD spectra of the anode of FIG. 6 taken before and after the electrochemical test in accordance with the present subject matter.

The material of the anode after 10 cycles of cyclic voltammetry testing between −3.1V and −1.4V with a final stop at −3.1V and after fluorination was analyzed by XRD, and the graph was compared to the initial XRD of the ball-milled $MoS_2$ before electrochemical testing. The XRD operation was conducted at 2θ from 10° to 90°, 0.027° increment, and 12 sec/step. The comparison is shown in FIG. 8, which includes an initial spectrum on the bottom and a subsequent spectrum on the top taken after the electrochemical test. The evolved peak of FIG. 8 indicate that fluorine got into the lattice of the $MoS_2$ layered material during the electrochemical test. More particularly, the $MoS_2$ main peaks are significantly decreased and new phases appeared.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of making an electrochemical cell, comprising:
   A) preparing an anode including by:
      1) providing a metal substrate,
      2) preparing a slurry in an inert atmosphere by mixing an anode active layered material, a conductive carbon, and a liquid binder, the anode active layered material comprising hard carbon, nitrogen doped graphite, boron doped graphite, $TiS_2$, $MoS_2$, $TiSe_2$, $MoSe_2$, $VS_2$, $VSe_2$, electrides of alkali earth metal nitrides, electrides of metal carbides, or combinations thereof,
      3) depositing the slurry on the metal substrate, and
      4) drying the slurry to thereby prepare the anode;
   B) providing a fluoride ion electrolyte and a cathode including a cathode active material comprising a fluoride ion host material; and
   C) arranging the electrolyte between the anode and the cathode;
   wherein the fluoride ion host material comprises C, Ag, Cu, Ni, Co, Pb, Ce, Mn, Au, Pt, Rh, V, Os, Ru, Fe, polyacetylene, polyaniline, polypyrrole, polythiophene, polyparaphenylene, or combinations thereof.

2. The method according to claim 1, wherein the slurry is dried in a vacuum chamber.

3. The method according to claim 1, wherein;
   the anode active layered material is included at 60-95 wt % of the slurry,
   the conductive carbon is included at 1-20 wt % of the slurry, and
   the liquid binder is included at 1-20 wt % of the slurry,
   the liquid binder includes a polymer dissolved in a solvent,
   the polymer comprises polyvinylidene difluoride, polyimide, polyacrylic acid, polyurethane, a mixture of carboxymethyl cellulose and styrene-butadiene rubber, polytetrafluoroethylene, or combinations thereof, and
   drying the slurry removes at least a portion of the solvent from the slurry.

4. The method according to claim 3, wherein the anode active layered material is included at 80-95 wt % of the slurry.

5. The method according to claim 3, wherein the conductive carbon comprises carbon black and is present in an amount of 7.5-12.5 wt % percent of the slurry.

6. The method according to claim 3, wherein the liquid binder is included at 7.5-12.5 wt % of the slurry.

7. The method according to claim 3, wherein the polymer is included at 1-50 wt % of the liquid binder.

8. The method according to claim 3, wherein the solvent includes N-methyl-2-pyrrolidone.

9. The method according to claim 1, wherein:
   the metal substrate includes a metal mesh;
   voids in the metal mesh accept the slurry; and
   when the slurry is dried, an interlocking matrix of the anode material is intermingled with the metal mesh.

10. The method according to claim 9, wherein the metal mesh is a stainless steel mesh.

11. The method according to claim 9, wherein the metal mesh is cleaned by sonication in an ethanol bath and dried in a vacuum oven before the slurry is deposited on the metal mesh.

12. The method according to claim 1, wherein the electrides of alkali earth metal nitrides comprise $Mg_2N$, $Ca_2N$, $Sr_2N$, or combinations thereof.

13. The method according to claim 1, wherein the electrides of metal carbides comprise $Y_2C$, lanthanide carbides, and combinations thereof.

14. The method according to claim 1, wherein the cathode includes copper (II) fluoride.

15. The method according to claim 1, wherein the cathode or the anode further includes a conductive diluent comprising acetylene black, carbon black, powdered graphite, coke, carbon fiber, metallic powder, or combinations thereof.

16. The method according to claim 1, wherein the electrochemical cell is a primary battery, a secondary electrochemical cell, a fuel cell, an electrolysis system, or a capacitor.

17. The method according to claim 1, wherein the electrolyte includes a solution including a dissolved fluoride salt.

\* \* \* \* \*